United States Patent
Samsavar et al.

[11] Patent Number: 5,955,661
[45] Date of Patent: Sep. 21, 1999

[54] OPTICAL PROFILOMETER COMBINED WITH STYLUS PROBE MEASUREMENT DEVICE

[75] Inventors: Amin Samsavar, San Jose; Michael Weber, Sunnyvale; Thomas McWaid, Fremont, all of Calif.; William P. Kuhn; Robert E. Parks, both of Tucson, Ariz.

[73] Assignee: KLA-Tencor Corporation, San Jose, Calif.

[21] Appl. No.: 08/779,087

[22] Filed: Jan. 6, 1997

[51] Int. Cl.$^6$ .................................................. G01B 5/28
[52] U.S. Cl. ........................................................ 73/105
[58] Field of Search ............................... 73/105; 750/306, 750/307

[56] References Cited

U.S. PATENT DOCUMENTS

| | | |
|---|---|---|
| 4,832,489 | 5/1989 | Wyant et al. . |
| 4,999,495 | 3/1991 | Miyata et al. ........................... 250/306 |
| 5,081,353 | 1/1992 | Yamada et al. ...................... 250/307 X |
| 5,117,110 | 5/1992 | Yasutake ................................ 250/306 |
| 5,142,145 | 8/1992 | Yasutake ................................ 250/306 |
| 5,347,854 | 9/1994 | Martin et al. . |
| 5,426,302 | 6/1995 | Marchman et al. . |
| 5,513,168 | 4/1996 | Fujihira et al. . |
| 5,627,365 | 5/1997 | Chiba et al. . |
| 5,650,614 | 7/1997 | Yasutake et al. .................... 250/306 X |

FOREIGN PATENT DOCUMENTS

| | | |
|---|---|---|
| 0536827 | 4/1993 | European Pat. Off. . |
| 0633450 | 1/1995 | European Pat. Off. . |
| 94/25888 | 11/1994 | WIPO . |

OTHER PUBLICATIONS

Griffith et al., "Dimensional Metrology with Scanning Probe Microscopes", J. Appl. Phys., vol. 79, No. 09, Nov. 1, 1993, pp. R83–R109.

Bhushan, Bharat, et al.; "Measurement of surface topography of magnetic tapes by Mirau interferometry"; *Applied Optics;* vol. 24, No. 10, May 15, 1985; pp. 1489–1497.

Bristow, Thomas C. and Dag Lindquist; "Surface Measurements With a Non–Contact Nomarski–Profiling Instrument"; *Interferometric Metrology;* SPIE vol. 816; Aug. 20–21, 1987; pp. 106–110.

Teague, E. Clayton; "The National Institute of Standards and Technology molecular measuring machine project: Metrology and precision engineering design"; *J. Vac. Sci. Technol.;* vol. B–7(6); Nov./Dec. 1989; pp. 1898–1902.

Bietry, Joseph; et al.; "A Nomarski viewing system for an optical surface profiler"; *Optical Testing and Metrology III: Recent Advances in Industrial Optical Inspection;* SPIE vol. 1332; Jul. 8–13, 1990; pp. 537–543.

Teague, E. Clayton; "Nanometrology"; *Proceedings of Scanned Probe Microscopy; STM and Beyond;* Jan. 1991.

(List continued on next page.)

*Primary Examiner*—Daniel S. Larkin
*Attorney, Agent, or Firm*—Majestic, Parsons, Siebert & Hsue P.C.

[57] ABSTRACT

An optical profilometer and a stylus probe measuring device used in the same instrument have the advantage that these two sensors can be quickly switched between each other. This can be an advantage when used to measure samples, since the optical profilometer can be used until a sample is found to be outside of the desired tolerances. Afterwards, the stylus probe measuring device can be used to accurately determine the profile data. This is an advantage because an optical profilometer is relatively quick, and the stylus probe measuring device is relatively accurate. Additionally, since the optical profilometer and stylus probe device are in the same instrument, the X and Y positions of these devices can be interrelated accurately. This allows images to be produced where the positions on the images can be easily correlated. For example, measurement cursors in sensor data displays can correlated by the positional offset information.

39 Claims, 6 Drawing Sheets

OTHER PUBLICATIONS

Kikuta, Hisao, et al.; "Force Microscopy Using Common–Path Optical–Heterodyne Interferometer"; *Japanese Journal of Applied Physics;* vol. 30, No. 3; Mar. 1991; pp. 587–590.

Koops, R. and G.A. Sawatzky; "New scanning device for scanning tunneling microscope applications"; University of Groningen, The Netherlands; 1992.

Anselmetti, D.,et al.; "Compact, combined scanning tunneling/force microscope"; *Rev. Sci. Instrum.;* 63(5); May 1992; pp. 3003–3006.

Hong, Gao and Xim Qiming; "Three–dimensional optical profiler using Nomarski interferometry"; *SPIE;* vol. 1994; pp. 150–153.

Stemmer, A.; "A hybrid scanning force and light microscope for surface imaging and three–dimensional optical sectioning in differential interference contrast"; *Journal of Microscopy;* vol. 178, Pt. 1; Apr. 1995; pp. 28–36.

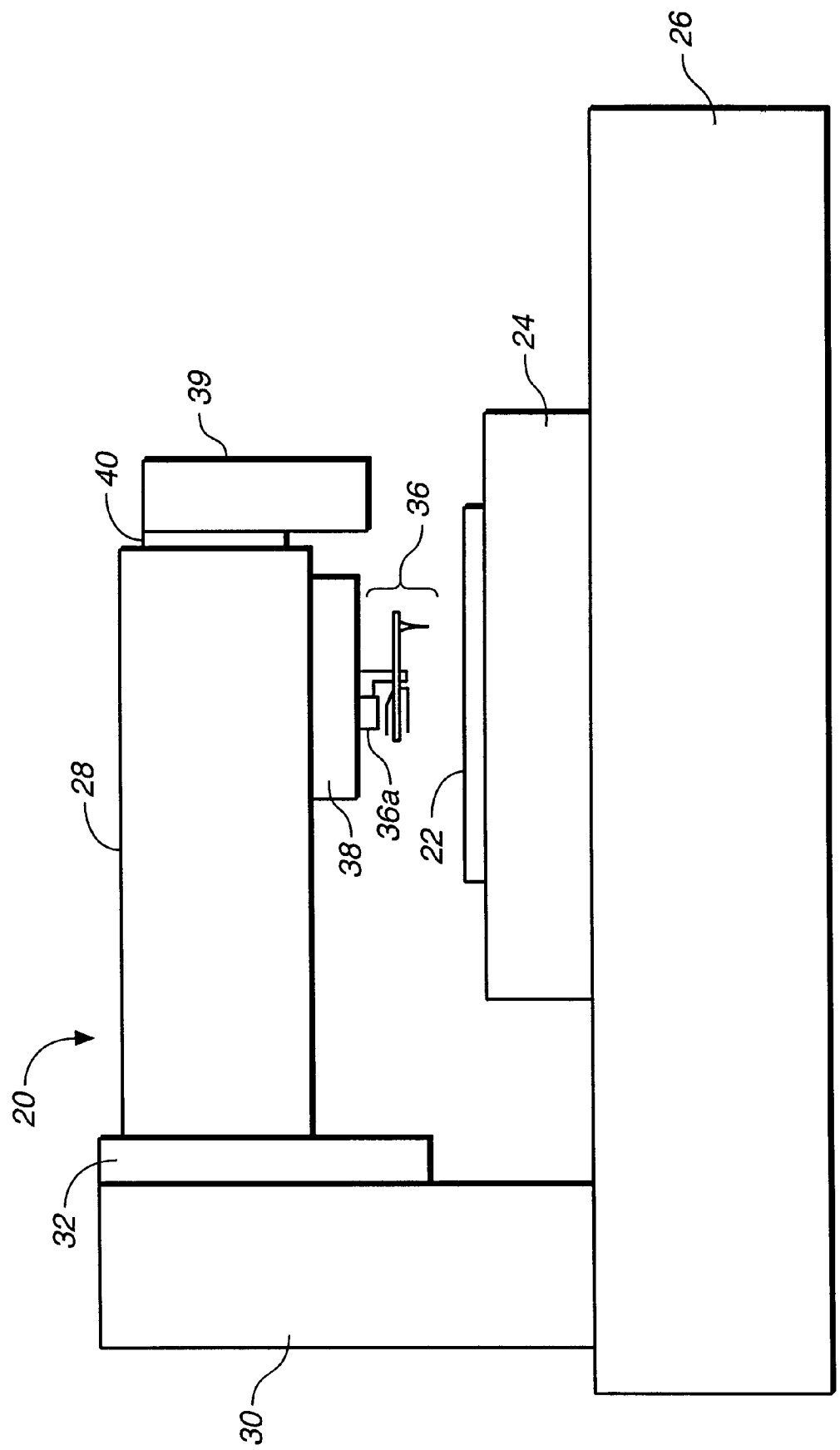
FIG._1

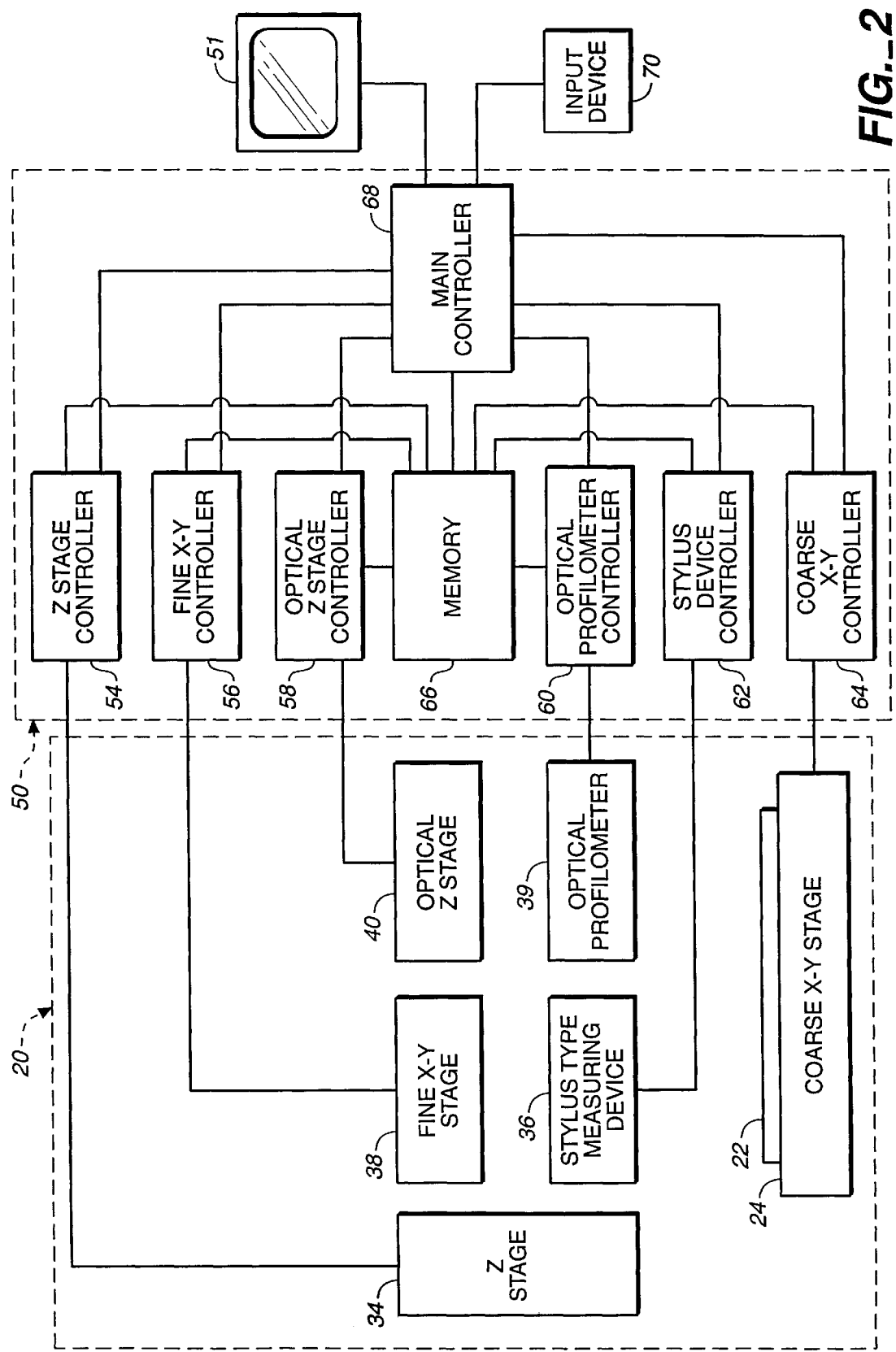
FIG._2

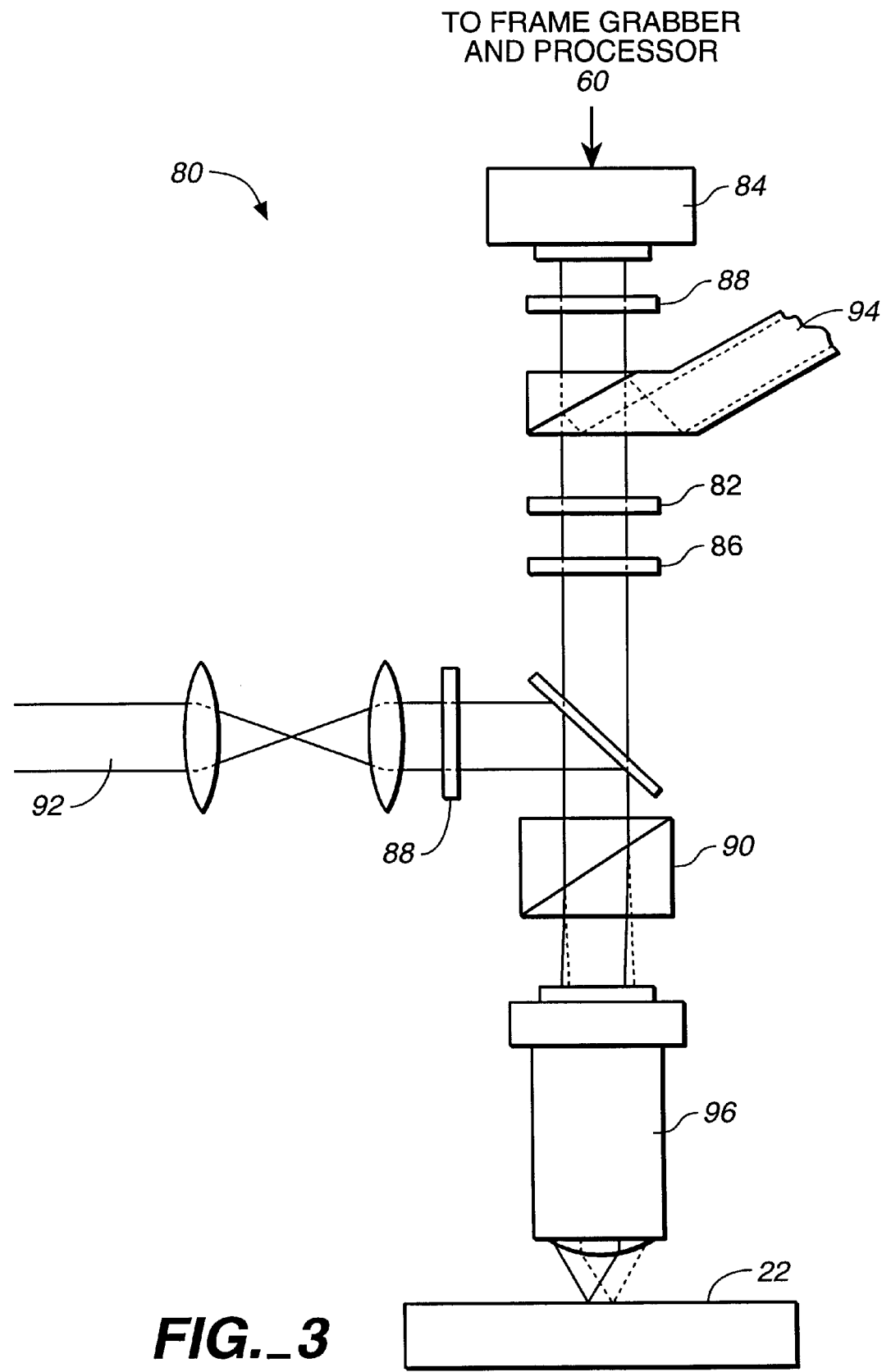
FIG._3

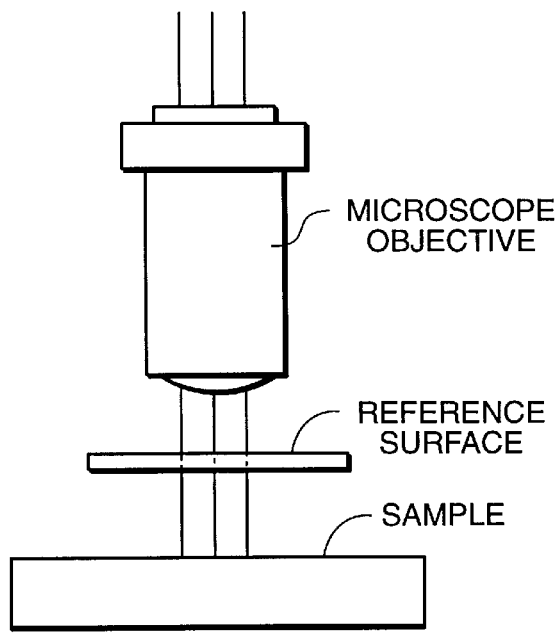
FIG._4A
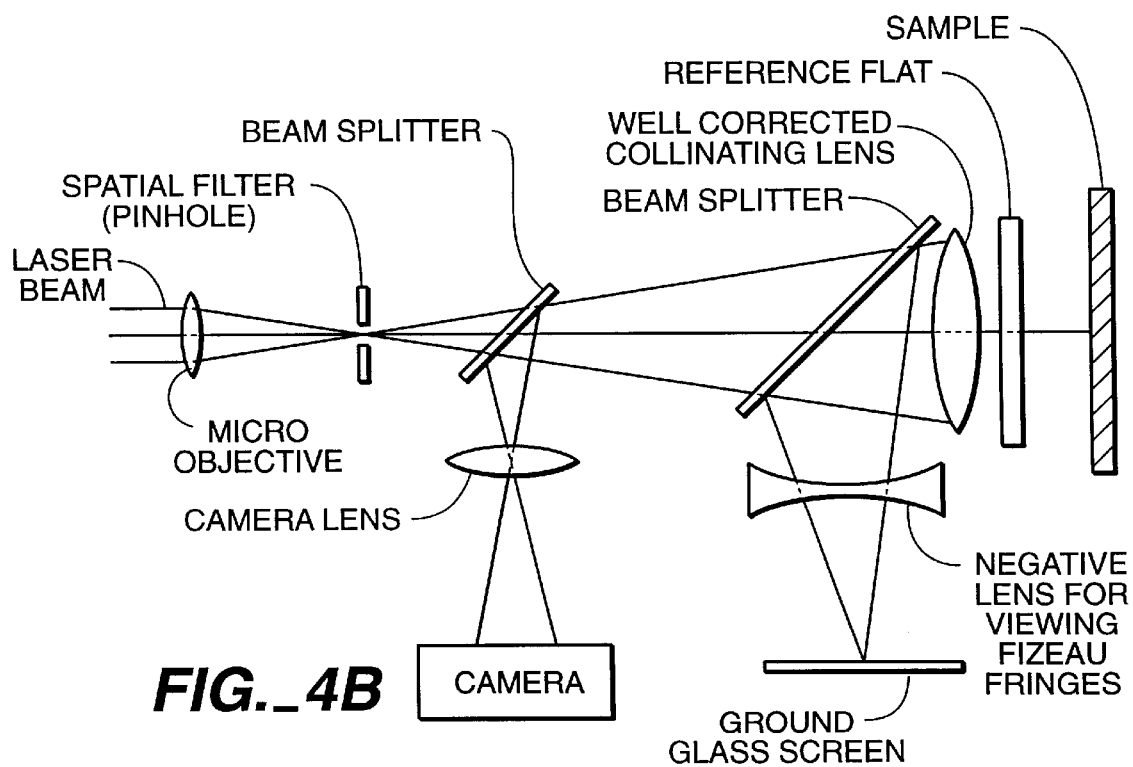
FIG._4B

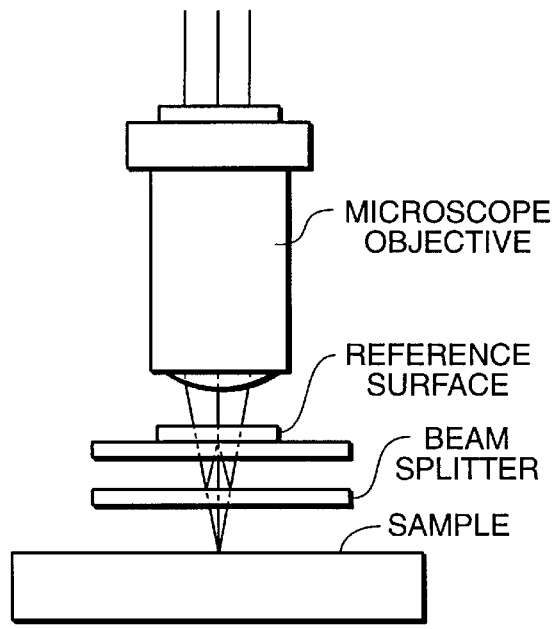
FIG._5
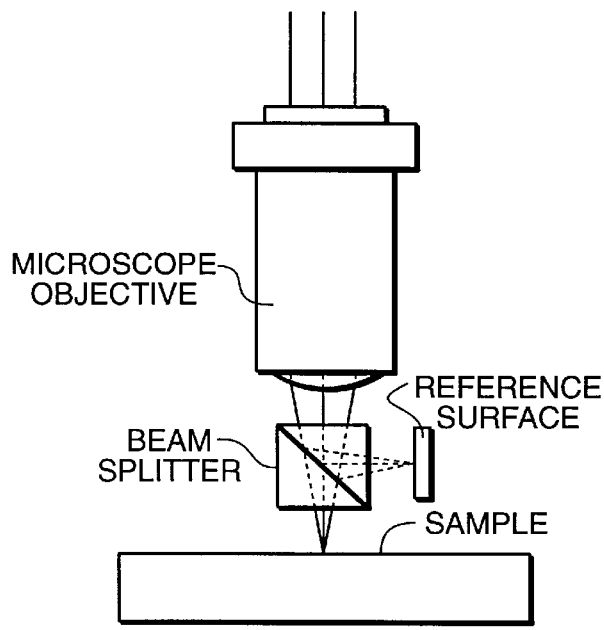
FIG._6
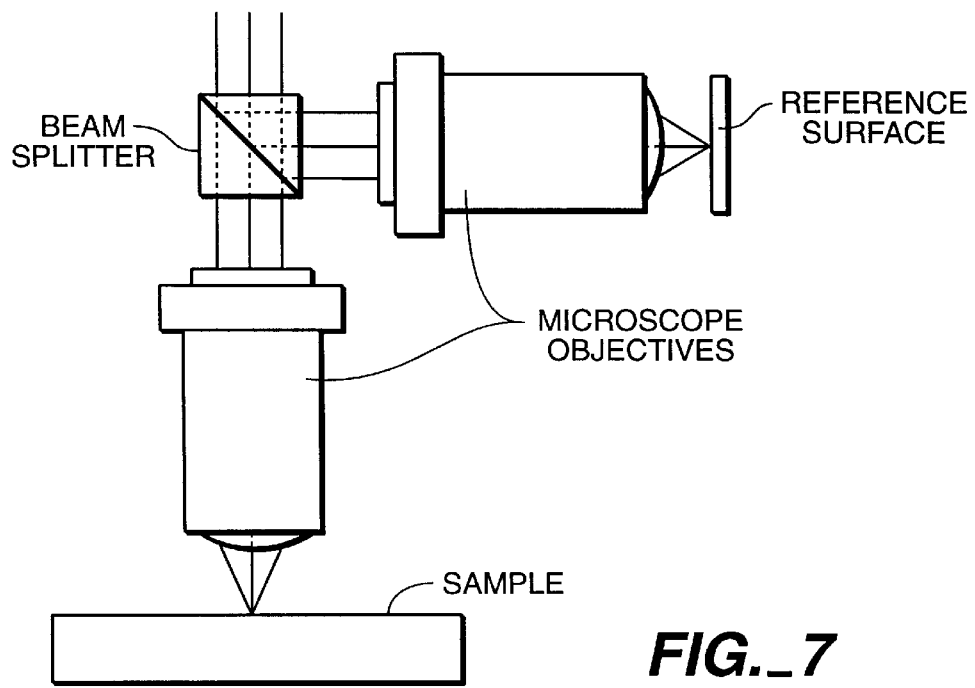
FIG._7

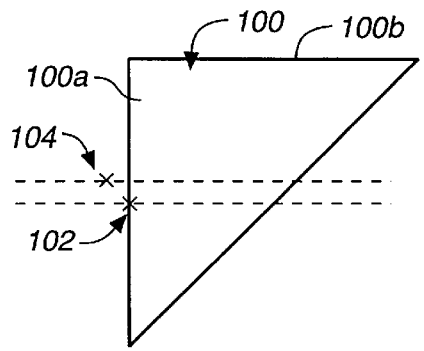
FIG._8
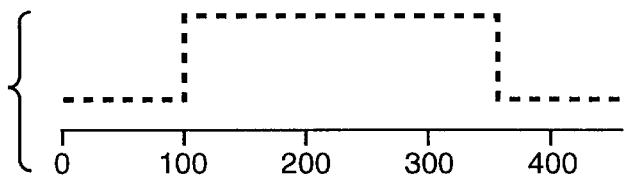
FIG._9A
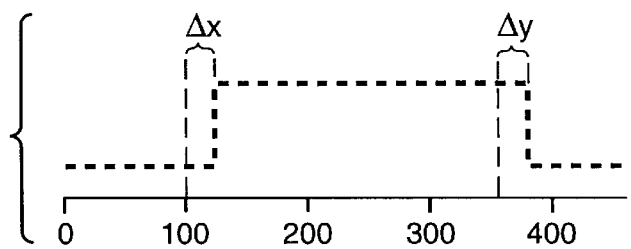
FIG._9B
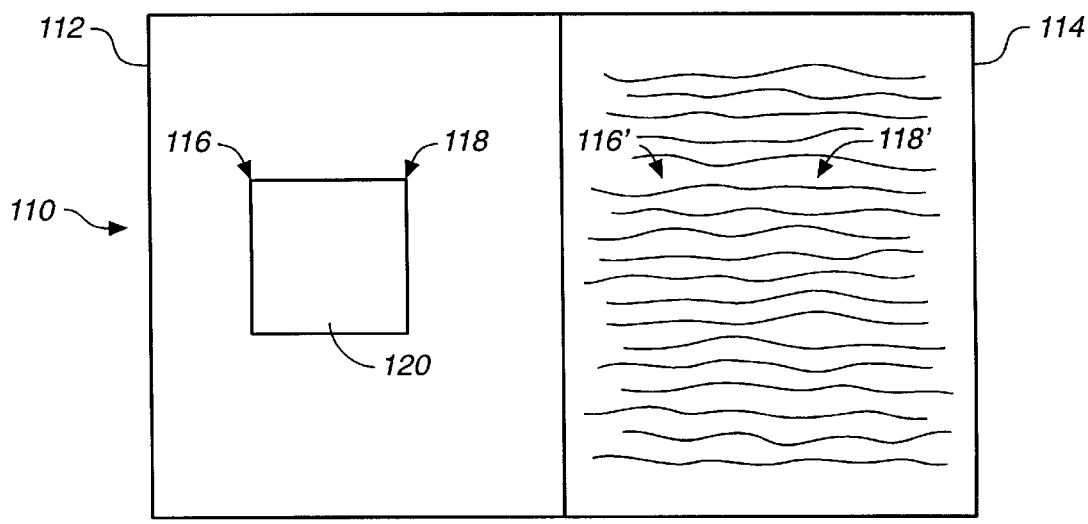
FIG._10

5,955,661

OPTICAL PROFILOMETER COMBINED WITH STYLUS PROBE MEASUREMENT DEVICE

BACKGROUND OF THE INVENTION

This invention relates in general to instruments for scanning samples for specimens and, in particular, a system for scanning samples or specimens with improved characteristics.

Profiling instruments were first developed for the purpose of characterizing surfaces in terms of roughness, waviness and form. In recent years, they have been refined for precise metrology in the measurement and production and control of semiconductor devices. Profiling instruments are also used outside the semiconductor industry, for example, for scanning and sensing optical disks, flat panel displays, and other devices.

One type of sensor used in profiling instruments includes sensors that are described in this application as being stylus probe instruments or stylus probe measurement devices. Stylus probe instruments are defined as including scanning probe microscopes. Scanning probe microscopes include atomic force microscopes, scanning tunneling microscopes and the like. Additionally, stylus probe instruments can include stylus profilometers, such as those described in U.S. patent application Ser. No. 08/598,848 entitled "Dual Stage Instrument for Scanning a Specimen" and filed Feb. 9, 1996, which is incorporated herein by reference. Another type of stylus profilometer is described in Wheeler et al. U.S. Pat. No. 5,309,755, which is incorporated herein by reference.

It should be noted that stylus probe instruments have traditionally been very slow, where an image of a surface could easily require minutes of data acquisition. The advantage of stylus probe instruments is that they can be made to be very precise. In the case of scanning probe microscopes, such as atomic force microscopes, the sensors have a very limited range in X, Y and Z—typically, from Angstroms to 100 microns in X and Y and a maximum of ten microns range in Z. Typical stylus profilometers have a range of 1 micrometer to 500 micrometers in X and Y and hundreds of microns in Z. Recently, a new stylus profilometer class of tools was introduced capable of scanning from 0.01 micrometers to 500 millimeters in X and Y and hundreds of microns in Z. This was described in the U.S. Patent Application "Dual Stage Instrument for Scanning a Specimen" discussed above.

It is desired to have a system that reduces the slowness and increases the throughput of the profiling instrument.

SUMMARY OF THE INVENTION

The present invention combines a stylus probe measuring device along with an optical profilometer in the same instrument. An optical profilometer is an optical device that determines Z or height information about the surface of a sample. The class of tools referred to in this application as optical profilometers include light scattering approaches, light sectioning and various interferometric optical profiling microscopes such as Fringes of Equal Chromatic Order (FECO), Nomarski polarization interferometer, and differential interference contrast (DIC), Tolansky multiple-beam interferometry, and two-beam-based interferometry based on Michelson, Linnik, Fizeau, and Mirau.

Optical profilometers can typically gather information from a large area of the sample (from micrometers to millimeters, set by the magnification power of the optics) very quickly (in less than one minute) and process the data. The optical profilometers have limited lateral resolution set by the diffraction limit of the light source utilized in the optical profilometer. Their lateral resolution is typically limited to 0.5 micrometers or so, dependent upon the wavelengths of the light source used. Other than the limited lateral resolution of these tools, changes in the material's reflectivity and any diffraction from the surface can induce faulty readings in the optical profilometer. The optical diffraction is especially noticeable at step edges and patterns on the sample surface.

The use of a stylus probe instrument and an optical profilometer in the same instrument has many advantages. The optical profilometer can quickly provide a coarse (low lateral resolution) image of the surface while the stylus probe device extends the lateral resolution of the combined tool to well below the light diffraction limits of the optical tool. By having both of these elements in the same instrument, the measurement system can quickly switch from using the optical profilometer to using the stylus probe measurement device or vice versa. The switching can be done under the automatic control of the system. For example, a mass-produced object such as a disk with laser bumps can be quickly scanned using the optical profilometer. If the optical profile measurement of the mass-produced object is determined to be outside of a tolerance range, a more precise profile using a stylus probe instrument can be made. The testing to see whether the sample is outside the tolerance range of the production system can be done without requiring the constant use of the relatively slow stylus probe instrument.

Additionally, the apparatus of the present invention can be used to quickly calibrate the height scale for an optical profilometer, based upon a few stylus probe instrument measurements. Furthermore, the stylus probe instrument can be used to determine a highly accurate indication of the XY position offset of the optical profilometer with respect to the stylus probe measuring device.

An accurate indication of the XY position offset allows for a direct correlation between the data acquired by the optical profilometer and data acquired by the stylus probe instrument. In particular, position cursors used to examine one data set can be directly and simultaneously correlated with the other. Thus, a cursor positioned on one displayed data set can have a corresponding cursor automatically positioned in the other displayed data set.

An additional advantage of the present invention is that it allows for features of interest that are easily detected with one sensor to be located and measured with the other. Thus, it allows for the features of interest to be quickly seen off of the optical profilometer and then the stylus probe device positioned where desired. This can be done with the multiple display described above. This is especially advantageous for measuring samples such as a pole tip recession in read/write heads for hard disks. A pole tip recession has a very high optical contrast; thus it can easily be detected with optical devices. However, the height variations across it can be minimal, about 10 angstroms. This makes it extremely difficult to depict the pole tip recession by just examining stylus probe data. The pole tip recession can be easily detected and measured with an optical device, and the stylus probe instrument positioned to measure its surface texture. In one embodiment, the cursors can be positioned in the optical profilometer image to correspond with the locations which the stylus probe instruments is to test.

Additionally, the present invention comprises a method of operating a sensing instrument comprising obtaining profile data about a sample using an optical profilometer, and obtaining profile data about the sample using a stylus probe measuring device, where the two obtaining steps are done without removing the sample from the instrument. By not removing the sample from the instrument, the present invention has the advantage that the processing is sped up and the images from the optical profilometer and the stylus probe instrument can be accurately correlated in X and Y.

An additional method of the present invention comprises operating a sensing instrument by providing an object, using an optical profilometer to position the stylus probe on the object, obtaining data about the object using the stylus probe measuring device, and using the stylus probe measurement device data to calibrate the x and Y position offset between the optical profilometer and the stylus probe measuring device. This method can be done by using a triangular-shaped test object as described below.

This calibration method can also be done with respect to an optical device and a scanning probe microscope. This inventive method comprises providing an object, using an optical device to position a scanning probe microscope on the test object, obtaining test data about the object, using a scanning probe microscope, and using the scanning probe microscope data to calibrate the X and Y position offset between the optical device and the scanning probe microscope.

An additional inventive method of the present invention comprises a method of operating a sensing instrument comprising providing an object having a pole tip recession, using an optical device to locate the pole tip recession, positioning the stylus probe measuring device at the pole tip recession, and obtaining profile information concerning the pole tip recession using the stylus probe measurement device.

The present invention can also comprise a method of operating a sensing instrument comprising providing an instrument having at least two sensors, measuring an object with one of the sensors, moving another of the sensors to a measuring location using positional offset information, measuring the object with the another of the sensors, producing displays of the measured data, measurement cursors in the displays being correlated by the positional offset information.

BRIEF DESCRIPTION OF THE DRAWINGS

FIG. 1 is a schematic view of an instrument used to illustrate a preferred embodiment of the present invention.

FIG. 2 is a block diagram of the instrument, control and display systems of a preferred embodiment of the instrument of FIG. 1.

FIG. 3 is a diagram of a Nomarski interferometer for use in the instrument of FIGS. 1 and 2 of the present invention.

FIGS. 4A and 4B are diagrams of a Fizeau interferometer for use in the instrument of FIGS. 1 and 2 of the present invention.

FIG. 5 is a diagram of a Mirau interferometer for use in the instrument of FIGS. 1 and 2 of the present invention.

FIG. 6 is a diagram of a Michelson interferometer for use in the instrument of FIGS. 1 and 2 of the present invention.

FIG. 7 is a diagram of a Linnik interferometer for use in the instrument of the present invention of FIGS. 1 and 2.

FIG. 8 is a diagram of a triangular test object used for XY calibration of the optical profilometer with respect to the stylus probe measurement device.

FIGS. 9A and 9B are diagrams of readings from a stylus probe measurement device regarding the test object device of FIG. 8.

FIG. 10 is a diagram of a display device illustrating displays from an optical profilometer and a stylus probe measurement device of a pole tip recession.

DETAILED DESCRIPTION OF THE PREFERRED EMBODIMENT

FIG. 1 is a schematic view of an instrument 20 used to illustrate a preferred embodiment of the present invention. The instrument 20 is used for sensing a sample 22. The sample 22 is placed on a coarse XY stage 24. The coarse XY stage 24 moves the sample in its XY plane with respect to the sensors. The coarse XY stage 24 and other components of the instrument are supported on the base 26. The sensor head 28 is connected by the Z-stage support 30 to the base 26. The Z-stage elevator 32 moves the sensor head assembly 28 in the Z-axis with respect to the sample 22. The sensor head 28 includes a stylus probe measuring device 36 as well as the optical profilometer 39. The stylus probe measuring device 36 can be a scanning probe microscope, such as an atomic force microscope, or a scanning tunneling microscope or the like.

Alternately, in a preferred embodiment, the stylus probe measuring device 36 is a stylus profilometer. The stylus profilometer can include a stylus arm with a stylus tip, a pivot and a rigid beam. The stylus arm can be connected to a device 36a such as a capacitance sensor, a linear voltage transformer sensor, or a light intensity proximity sensor. Such a stylus profilometer is described in the U.S. Patent Application "Dual Stage Instrument for Scanning a Specimen" Ser. No. 08/598,848 filed Feb. 9, 1996, which is incorporated herein by reference. The stylus profilometer could also be of the type described by Wheeler et al. in U.S. Pat. No. 5,309,755.

The stylus probe measuring device 36 can sense height, electrostatic potential, thermal changes, magnetic, lateral forces, near field optical variations, electrical, or Van der Waals force variations across the sample. The stylus probe sensor can be operated in contact, intermittent contact, or non-contact mode. In this embodiment, contact mode refers to a mode in which the stylus tip remains in physical contact with the surface during scanning. Intermittent contact refers to a mode in which the stylus lifts away from the surface, losing contact with the surface. The stylus can lift up periodically (such as sinusoidally), or for a random amount of time. The stylus can leave the surface with an amplitude that is an arbitrary or a constant height above the surface. Non-contact mode is a mode in which the stylus tip does not contact the surface during the scan. Its distance from the surface may, however, be varied (arbitrary or periodically), or be a fixed height. The amplitude of motion can also be adjusted arbitrarily or be constant.

The optical profilometer is preferably an optical interferometer. An optical interferometer uses interference between light on two beam paths in order to determine height information about the sample surface. As the sample surface height changes, one of the path lengths will change, causing a change in the interference effects. Optical profilometers are described with respect to FIGS. 3 through 7 below. In a preferred embodiment, the optical profilometer is a Nomarski interferometer.

Looking again at FIG. 1, the positioning means for the sample with respect to the sensors can be the coarse XY stage 24 and a sensor head Z-elevator stage 32. In a preferred embodiment, the stylus probe instrument 36 has its own fine XY stage 38, as described in the Samsavar, et al. U.S. patent application Ser. No. 08/598,848 discussed above. Additionally, the optical interferometer 39 can have its own Z-stage 40.

The positioning means described above is only for a preferred embodiment. The positioning means can be any type of device used to position the sample 22 with respect to the stylus probe measuring device 36 and optical profilometer 39. This can include an XY stage by itself, an XY stage in combination with a single Z stage, or any other type of positioning device.

FIG. 2 is a block diagram of the instrument 20, control 50, and display 51 systems of a preferred embodiment. The control system 50 can include separate controllers 54, 56, 58, 60, 62 and 64. These separate controllers 54 through 64 are shown for the different active elements of the instrument 20. In the embodiment shown, each of the controllers 54–64 shares memory 66. This allows for the information, such as the XY positions as determined by the optical profilometer, to be cross-correlated with the XY positions for the stylus-type measuring device. The different individual controllers 54, 56, 58, 60, 62 and 64 are shown connected to a main controller 68.

Alternately, a single processor (not shown) could be multi-tasked to control the different active elements of the instrument 20.

FIGS. 3–7 show different embodiments of an optical profilometer which can be used with the instruments of FIGS. 1 and 2. FIG. 3 is a diagram of a Nomarski interferometer which can be used as the optical profilometer. Nomarski interferometers are described in the paper "Three-Dimensional Optical Profiler Using Nomarski Interferometry" written by Hong et al., SPIE, Volume 1994, pp. 150–153, from which FIG. 3 and the discussion of this figure are adapted. This paper is incorporated herein by reference.

The Nomarski optical profilometer consists of a differential interferomic microscope using a rotating analyzer 82 for phase shift, a charge couple device CCD image detector 84, frame grabber (not shown), and computer (processor 60 of FIG. 2). The surface slope can be quantitatively obtained by using phase shifting interferometry. The slope data is integrated to yield the surface profile. The interferometer 80 uses a commercially-available Nomarski DIC microscope with a few modifications. A quarter wavelength plate 86, spectral filter 88, and CCD camera 84 have been added. The microscope 80 uses a polarizer 88 and Nomarski prism 90 to illuminate the sample with two orthogonally-polarized beams offset on the sample surface by a distance smaller than the resolution limit of the objectives. The direction of the offset between the two beams defines a Nomarski shearing direction. After reflection from the sample, the two beams spatially recombine using a Nomarski prism 90. The two orthogonally-polarized beams are converted by a quarter wavelength plate 86, with its fast axis oriented at forty-five degrees through the shearing direction, into the right and left circularly polarized light, respectively. The two beams then pass through an analyzer that allows the formation of a DIC image and the relative phase shift between the two beams reflected from the sample. The intensity distribution DIC image contains quantitative information regarding the surface below. The amount of relative phase shift between the two beams varies linearly with the azimuth angle of the analyzer. The images are detected by the CCD camera 84. The frame grabber is used to take the image data on display to the computer, such as the optical profilometer controller 60 shown in FIG. 2. The computer is used to rotate the analyzer in a way that the phase difference between the two orthogonally-polarized beams is stepped four times in increments of II/2. Once four images for four phase differences are digitized, the computer calculates the phase at each detector element. The phase is proportional to the surface slope at that location. The slope data is integrated to yield a surface profile.

The light source 92 is preferably a tungsten halogen bulb. A narrow bandwidth filter of 30 nanometers bandwidth centered at a wavelength of 633 nanometers can be used to reduce the spectral bandwidth of the source and increase its coherent length. The equations for the phase measurement used to determine the profile information are given in the Hong, et al. paper discussed above. FIG. 3 also shows an optional eyepiece 94 and a microscope objective 96.

Optical profilometers are distinct from mere optical microscopes. Optical microscopes have been used in prior art systems to image the sample and position stylus probe instruments. Optical microscopes cannot obtain precise height information from a sample surface.

A reference entitled "The National Institute of Standards and Technology Molecular Measuring Machine Project: Metrology and Precision Engineering Design," authored by E. Clayton Teague, printed in the *Journal of Vacuum Science and Technology*, B7(6), November/December 1989, pps. 1898–1902, describes an XY heterodyne interferometer that is used to accurately determine the XY position of a sample with respect to a scanning tunneling microscope. The XY heterodyne interferometer is not used for obtaining a profile of the sample and thus cannot be considered an optical profilometer.

FIGS. 4A and 4B are diagrams of a Fizeau interferometer microscope, which could be used as the optical profilometer used with the instrument of the present invention. FIG. 5 shows a Mirau interferometer which can be used with the instruments of the present claimed invention. A good general discussion of optical interferometry is given in the paper entitled "Measurement of Surface Topography of Magnetic Tapes by Mirau Interferometry" authored by Bhushan et al., *Applied Optics*, Volume 24, No. 10, May 15, 1985, pp. 1489–1497, which is incorporated herein by reference. Another reference is "Optical Shop Testing," by Daniel Malacara, Second Edition 1992, John Wiley & Sons, Inc.

FIG. 6 is a diagram of a Michelson interferometer microscope that could be used with the instrument of the present invention. FIG. 7 is a diagram of a Linnik interferometer microscope which can be used with the instrument of the present invention.

Since both the optical profilometer and the stylus probe measuring device are on the same instrument, the XY position offset between these two devices can be accurately calibrated. In the first approximation, the optical profilometer and the stylus probe measuring device have an XY position offset as indicated by the instrument design. Additional calibrations can be done so that the more exact XY position offset can be determined. One such method is described with respect to FIGS. 8 and 9A-B below.

FIG. 8 is a diagram of a test object for use in an XY calibration method of the present invention. An object having a known geometry, such as a triangle 100 shown in FIG. 8, can be measured with the optical profilometer. The same object is moved precisely to a first approximation of the offset between the two objects. Data from the measured object is then analyzed using a stylus probe measuring device to give its location relative to the data from the optical profilometer. This gives a refinement to the first approximation of the offset, and is added to it. An example of such a method is described with respect to the triangle 100 shown below.

The triangle 100 is formed as a right triangle with two sides 100a and 100b each five hundred microns long. The triangle is large enough that it can be easily located using the optical profilometer. Once an edge of the triangle is located, the triangle is moved within the close proximity of the stylus probe profilometer. The amount of the move or offset between the sensors is set by the theoretical design. The machining and assembly of the instrument will produce an error in this offset. In a preferred embodiment, the optical profilometer can determine an exact midpoint of edge 1. In this case, the location is point 102, midway alongside 1. The triangle is moved by the mechanical design offset between the optical profilometer and the stylus probe sensor. If the mechanical design offset is exactly correct, the stylus of the stylus probe measuring device would be at point 102. In this example of FIG. 8, there is a slight offset error so the stylus is actually at point 104. The stylus is then moved 100 microns to the left of this location and a 1000 micron right trace is done. The X offset error is its leading edge minus 100 microns. Next, the width of the step is measured. The Y offset error is its width minus 250 microns. This is because the object is a right triangle with equal short sides, so any Y position above point 102 will have an increased width and any Y position below point 102 will have a decreased width, from 250 microns. The total offset is then the sum of the design offset plus the errors measured.

FIGS. 9A and 9B illustrate this concept. FIG. 9A shows a stylus probe measurement profile, which would occur if the stylus starts at a point 100 microns left of point 102. If this is the case, the stylus probe microscope will move 100 microns, contact the edge of the triangle, and for 250 microns have a raised step and then drop down. FIG. 9B illustrates what would occur if the stylus probe starts at a point 100 microns left of point 104. In this instance, there will be a ΔX corresponding to the difference between 100 microns and when the step moves upward. There is also a ΔY shown, for which the step is greater than 250 microns.

The inventors are unaware of any such calibration done between an optical profilometer and any type of stylus probe device. In the past, a similar calibration technique has been done using an optical microscope and a stylus profilometer. An additional method of the present invention uses any optical device and a scanning probe microscope to be calibrated in a similar manner.

FIG. 10 illustrates a display means 110. The display means 110 is shown with two images 112 and 114. Image 112 is an image from an optical profilometer. Image 114 is an image from a stylus probe measuring device. As described above, there is a precise correlation between X and Y positions of the optical profilometer and the stylus probe measuring device. The positions on the displays 112 and 114 can be automatically interrelated by the system. For example, cursors 116, 118 placed in display 112 of the optical profilometer cause the computer to automatically place cursors 116', 118' in display 114 of the stylus probe measuring device. The correlation of the displays is possible because the optical profilometer and the stylus probe measuring device are on the same instrument.

In FIG. 10, a pole tip recession 120 is clearly seen in the display 112 with the optical profilometer. The pole tip recession is made of a different material than the background material which clearly shows up within an optical device. This pole tip recession is relatively hard to see in the stylus probe measuring device display 114. Since both the optical profile and the stylus probe measurement device are in the same instrument, the cursors 116 and 118 can be placed in the image 112 in order to control the path of the stylus probe measuring device. This allows the stylus probe measuring device to measure the texture of the pole tip recession. Although the pole tip recession can be easily seen with the optical profilometer, the texture on the pole tip recession cannot be as accurately determined with an optical profilometer. This texture can best be determined with the stylus probe measuring device.

While the invention has been described above with respect to various embodiments, it will be understood that the changes and modifications can be made without departing from the scope of the invention, which is to be limited only by the appended claims.

What is claimed is:

1. An instrument for profiling a sample, comprising:
   a stylus probe measuring device;
   an optical profilometer that determines height information about a surface of the sample;
   positioning means for positioning the stylus probe measuring device and the optical profilometer with respect to the sample; and
   a controller adapted to control the positioning means.

2. The instrument of claim 1, wherein the stylus probe measuring device comprises a probe adapted to be positioned at or near the sample surface.

3. The instrument of claim 2, wherein the stylus probe measuring device is a stylus profilometer.

4. The instrument of claim 3, wherein the stylus profilometer comprises:
   a stylus arm having a stylus tip; and
   a capacitance gauge, a linear voltage differential transformer sensor, or a light intensity proximity sensor.

5. The instrument of claim 1, wherein the stylus probe measuring device comprises a scanning probe microscope.

6. The instrument of claim 5, wherein the stylus probe measuring device comprises an atomic force microscope.

7. The instrument of claim 1, wherein the controller is adapted to calibrate profile data from the optical profilometer using data from the stylus probe measuring device.

8. The instrument of claim 1, wherein the optical profilometer is an optical interferometer.

9. The instrument of claim 8, wherein the optical interferometer is a Nomorski optical interferometer.

10. The instrument of claim 1, wherein the stylus probe measuring device has a known positional relation to the optical profilometer.

11. The instrument of claim 10, wherein the controller is adapted to calibrate the XY offsets of the optical profilometer with respect to the stylus probe measuring device.

12. The instrument of claim 10, wherein the stylus probe measuring device has a fixed position with respect to the optical profilometer.

13. The instrument of claim 10, wherein the stylus probe measuring device has a movable position with respect to the optical profilometer.

14. The instrument of claim 1, wherein the positioning means includes an XY translator to hold the sample.

15. The instrument of claim 1, wherein the positioning means includes a Z translator attached to a sensor head containing the stylus probe measuring device and optical profilometer.

16. The instrument of claim 1, wherein the positioning means includes an XY translator attached to the stylus probe measuring device.

17. The instrument of claim 16, wherein the optical profilometer is not attached to the XY translator.

18. The instrument of claim 17, wherein the XY translator has a home position in which the optical profilometer has a known positional relation in an X and Y direction to the stylus probe measuring device.

19. The instrument of claim 1, wherein the positioning means includes a Z translator attached to the optical profilometer but not the stylus probe measuring device.

20. The instrument of claim 1, further comprising a display means for displaying profile data.

21. The instrument of claim 20, wherein the controller is further adapted to control the display of the profile data, the controller being adapted to produce a first display for the optical device data and a second display for the stylus probe data, wherein the controller is being adapted to display a cursor on one of the displays so that it corresponds to a position of a cursor on another of the displays.

22. The instrument of claim 21, wherein the controller is adapted to calibrate the XY offsets of the optical profilometer with respect to the stylus probe measuring device to increase the accuracy of the cursor positioning.

23. A method of operating a sensing instrument comprising:
    providing an object;
    using an optical profilometer to position a stylus probe measuring device on the object;
    obtaining data about the object using stylus probe measuring device; and
    using the stylus probe measuring device data to calibrate the X and Y position offset between the optical profilometer and the stylus probe measuring device.

24. The method of claim 23, wherein the providing step comprises providing an object with a raised edge.

25. The method of claim 24, wherein the stylus data obtaining step includes sweeping the stylus probe measuring device toward the raised edge so that an offset along one axis is determinable from an indication of the raised edge.

26. The method of claim 25, wherein the test object includes a triangle-shaped portion with the raised edge and wherein the length of a sweep across the triangle determined by the stylus probe measurement device allows for the determination of the offset along another axis.

27. A method of operating a sensing instrument comprising:
    providing a test object;
    using an optical device to position a scanning probe microscope on the test object;
    obtaining data about the test object using a scanning probe microscope; and
    using the scanning probe microscope data to calibrate the X and Y position offset between the optical device and the scanning probe microscope, wherein the providing step comprises providing a test object with a raised edge and wherein the scanning probe microscope data obtaining step includes sweeping the scanning probe microscope towards the raised edge so that an offset along one axis is determinable from an indication of the raised edge.

28. The method of claim 27, wherein the test object includes a triangle-shaped portion with the raised edge and wherein the length of a sweep across the triangle determined by the scanning probe microscope allows for the determination of the offset along another axis.

29. A method of operating a sensing instrument comprising:
    obtaining profile data about a sample using an optical profilometer; and
    obtaining profile data about the sample using a stylus probe measuring device; wherein the two obtaining steps are done without removing the sample from the instrument.

30. The method of claim 29, wherein the stylus probe measuring device data is used to calibrate the height profile data of the optical profilometer.

31. The method of claim 29, wherein the stylus profile measuring step is done after the profile determined by the optical profilometer is outside a predetermined tolerance, the stylus profile measuring step producing a more accurate determination of the profile.

32. The method of claim 29, wherein the sample includes laser bumps.

33. A method of operating a sensing instrument comprising:
    providing an object;
    using an optical profilometer to locate a position on an object;
    positioning a stylus probe measuring device at the position; and
    obtaining profile information concerning the position using the stylus probe measuring device.

34. The method of claim 33, wherein the object has a pole tip recession at the position.

35. The method of claim 34, wherein the obtaining step includes obtaining information about the texture of the pole tip recession.

36. The method of claim 33, wherein data from the optical device is displayed on a display means.

37. A method of operating a sensing instrument comprising:
    providing an instrument having at least two sensors;
    measuring an object with one of the sensors;
    moving another of the sensors to a measuring location using positional offset information;
    measuring the object with the other of the sensors; and
    producing displays of the measured data, measurement cursors in the displays being correlated by the positional offset information.

38. The method of claim 37, further comprising the step of determining the positional offset information using the at least two sensors.

39. The method of claim 37, wherein the providing step is such that the at least two sensors include an optical profilometer and a stylus probe measuring device.

* * * * *